(12) United States Patent
Utsch

(10) Patent No.: US 9,695,967 B2
(45) Date of Patent: Jul. 4, 2017

(54) CONNECTION APPARATUS

(71) Applicant: Pfeiffer Vacuum GmbH, Asslar (DE)

(72) Inventor: Helmut Utsch, Siegen (DE)

(73) Assignee: Pfeiffer Vacuum GmbH, Asslar (DE)

( * ) Notice: Subject to any disclaimer, the term of this patent is extended or adjusted under 35 U.S.C. 154(b) by 416 days.

(21) Appl. No.: 14/156,614

(22) Filed: Jan. 16, 2014

(65) Prior Publication Data

US 2014/0203550 A1 Jul. 24, 2014

(30) Foreign Application Priority Data

Jan. 18, 2013 (DE) .......... 10 2013 200 765

(51) Int. Cl.
| | |
|---|---|
| *F16L 37/12* | (2006.01) |
| *F16L 23/036* | (2006.01) |
| *F16L 37/20* | (2006.01) |
| *B25B 5/12* | (2006.01) |
| *F16B 2/18* | (2006.01) |

(52) U.S. Cl.
CPC .......... *F16L 37/1205* (2013.01); *B25B 5/125* (2013.01); *B25B 5/127* (2013.01); *F16L 23/036* (2013.01); *F16L 37/20* (2013.01); *F16B 2/185* (2013.01)

(58) Field of Classification Search
CPC ..... F16L 37/1205; F16L 23/036; F16L 37/20; B25B 5/127; B25B 5/125; F16B 2/185
USPC .......................................... 285/308
See application file for complete search history.

(56) References Cited

U.S. PATENT DOCUMENTS

| | | | | |
|---|---|---|---|---|
| 1,331,715 | A | * 2/1920 | Lindfors | ........... F16L 37/20 285/311 |
| 2,327,368 | A | * 8/1943 | Olson | ........... B25B 7/04 269/228 |
| 2,379,107 | A | * 6/1945 | Scheck | ........... B25B 7/123 269/208 |
| 2,800,042 | A | * 7/1957 | Demler | ........... H01R 43/033 72/409.08 |

(Continued)

FOREIGN PATENT DOCUMENTS

| | | |
|---|---|---|
| BE | 363267 A | 9/1929 |
| DE | 894 641 | 7/1949 |

(Continued)

OTHER PUBLICATIONS

English translation of German Search Report dated Nov. 7 and issued in German (priority) Patent Application DE 10 2013 200 765.5.

*Primary Examiner* — Babajide Demuren
(74) *Attorney, Agent, or Firm* — Abelman, Frayne & Schwab

(57) ABSTRACT

A connection apparatus for establishing a vacuum-tight connection, in particular a flange connection, between at least two components of a vacuum arrangement, having a first coupling element for coupling to the one component and a second coupling element for coupling to the other component. The first coupling element and the second coupling element are coupled to one another via a pivotable operating lever and the connection apparatus is adjustable by pivoting the operating lever from a first position in which the coupling elements have a larger spacing from one another into a second position in which the coupling elements have a smaller spacing from one another.

18 Claims, 6 Drawing Sheets

(56) References Cited

U.S. PATENT DOCUMENTS

| | | | |
|---|---|---|---|
| 3,379,460 A | 4/1968 | Allyn | |
| 5,435,604 A * | 7/1995 | Chen | F16L 37/18 |
| | | | 285/312 |
| 6,090,190 A | 7/2000 | Ennsen | |
| 6,315,278 B1 * | 11/2001 | Gaztanaga | B25B 5/12 |
| | | | 269/228 |
| 7,914,053 B2 | 3/2011 | Keller | |
| 2005/0058554 A1 | 3/2005 | Fahrenbach | |
| 2009/0295155 A1 * | 12/2009 | Keller-Staub | F16L 23/18 |
| | | | 285/365 |
| 2010/0299890 A1 * | 12/2010 | Doyle | A61G 7/05 |
| | | | 24/457 |
| 2013/0300107 A1 * | 11/2013 | Lavagnini | F16L 27/04 |
| | | | 285/308 |

FOREIGN PATENT DOCUMENTS

| | | | | |
|---|---|---|---|---|
| DE | 947 035 | | 8/1956 | |
| DE | 960436 C | * | 3/1957 | F16L 37/20 |
| DE | 964822 C | * | 5/1957 | F16L 37/20 |
| DE | 1030801 B | * | 5/1958 | F16L 37/20 |
| DE | 1196449 B | * | 7/1965 | F16L 23/036 |
| DE | 2804769 A1 | * | 8/1979 | F16L 37/20 |
| DE | 3152016 A1 | * | 7/1983 | B25B 5/02 |
| DE | 87 00 44 88.8 | | 4/1987 | |
| DE | 19755244 C1 | * | 4/1999 | |
| DE | 10233242 A1 | | 5/2004 | |
| DE | 202008008692 U1 | | 9/2008 | |
| DE | 102008017447 A1 | * | 10/2009 | F16B 2/185 |
| DE | 102013002538 A1 | * | 3/2014 | B25B 5/127 |
| DE | 202013100901 U1 | * | 6/2014 | F16L 37/34 |
| EP | 936 391 A1 | | 8/1999 | |
| EP | 1 908 998 A1 | | 4/2008 | |
| EP | 2 133 581 | | 12/2009 | |
| ES | WO 0053373 A | * | 9/2000 | |
| FR | 1563572 A | * | 4/1969 | F16L 37/1205 |
| GB | 382 069 | | 10/1932 | |
| GB | 1 331 426 | | 9/1973 | |
| GB | 2253020 A | * | 8/1992 | B65D 45/32 |
| JP | 3 117 107 | | 12/1991 | |
| LU | 61568 A1 | | 4/1972 | |
| WO | WO 2011153081 A2 | * | 12/2011 | |

* cited by examiner

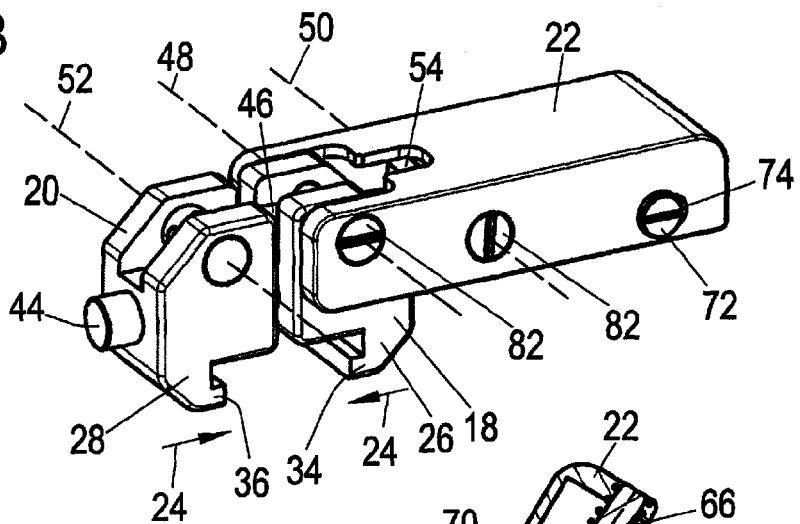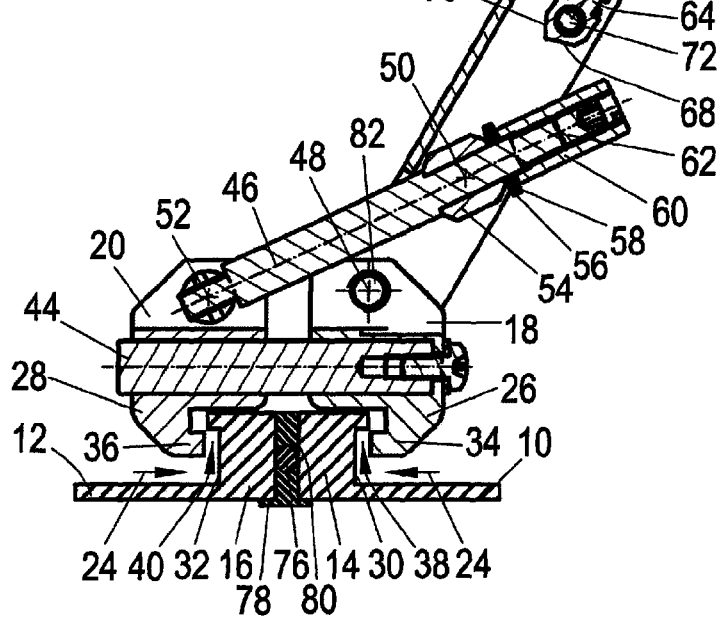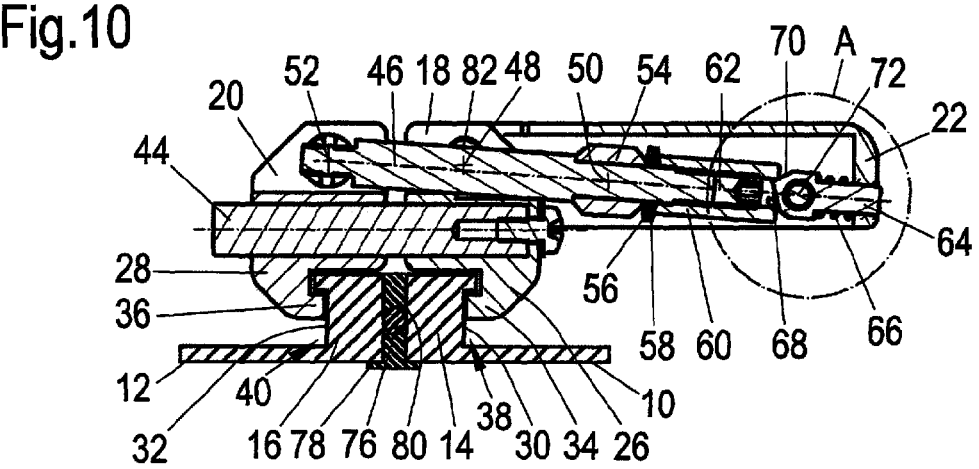

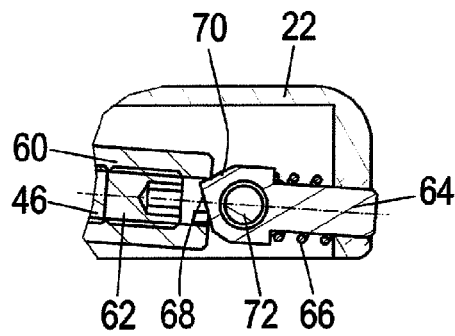
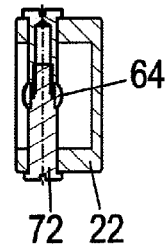
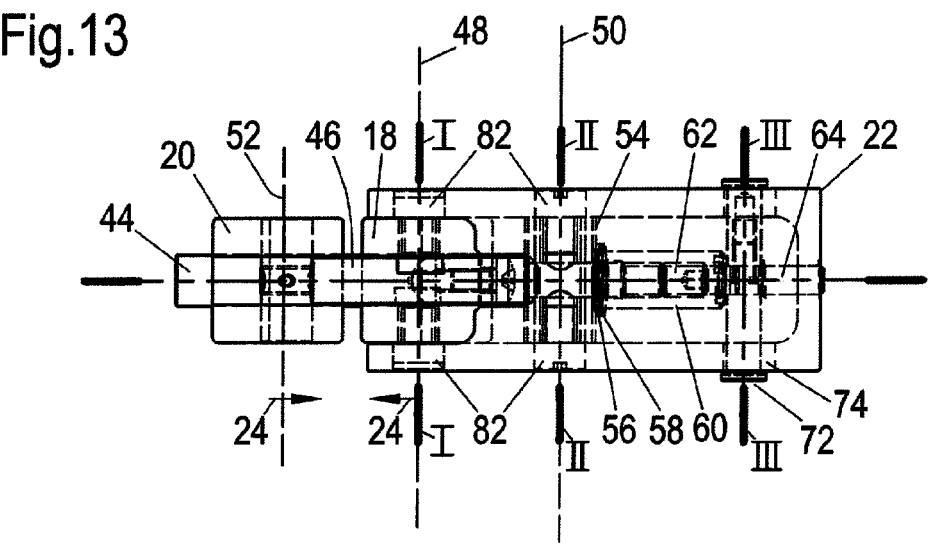
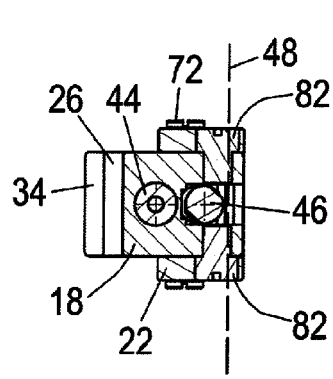
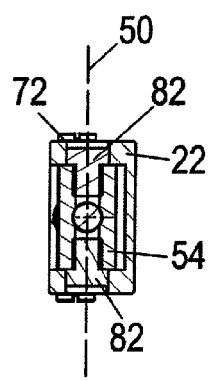

CONNECTION APPARATUS

BACKGROUND OF THE INVENTION

1. Field of the Invention

The invention relates to a connection apparatus for establishing a vacuum-tight connection, in particular a flange connection, between at least two components of a vacuum arrangement.

2. Description of the Prior Art

Vacuum-tight connections between components of a vacuum arrangement, for example between a gas-conducting pipe and a metal-spring bellows or an air-spring bellows which can serve as a connector piece or as a compensation piece of a vacuum pipework, typically comprise one or more connection apparatus with which the components to be connected are mechanically fixed to one another such that a vacuum-tight connection is created between the components.

Known connection apparatus are, for example, clamps which have two clamping jaws between which the components to be connected can be clamped. The clamping jaws are typically connected to one another by a screw connection via which the clamp is adjustable between a released position in which the clamp can be placed onto the flanges and a tightened position in which the clamp fixes the two components to one another. Clamps are furthermore known which have a claw for coupling to one of the components to be connected and which can be screwed to the other component to establish the vacuum-tight connection.

It is disadvantageous in the known connection apparatus that they can only be adjusted using a tool for loosening and tightening the screws between the loosened and tightened positions, whereby the time effort and work effort required for the establishing and the releasing of the connection is increased. The establishment of a reliable and secure connection additionally requires not insubstantial skill and high care of the user.

It is the object of the invention to provide a connection apparatus of the initially named kind with which a reliable and secure vacuum-tight connection can be established between two components of a vacuum arrangement in a simple and fast manner and in particular manually and without tools.

SUMMARY OF THE INVENTION

The object of the invention is achieved by providing a connection apparatus that serves for the establishing of a vacuum-tight connection, in particular of a flange connection, between at least two components of a vacuum arrangement and comprises a first coupling element for coupling to the one component and a second coupling element for coupling to the other component. The first coupling element and the second coupling element are coupled to one another via a pivotable operating lever and the connection apparatus is adjustable by pivoting the operating lever from a first position in which the coupling elements have a larger spacing from one another into a second position in which the coupling elements have a smaller spacing from one another.

The adjustment over the operating lever can take place manually without using a tool so that the establishing of a vacuum-tight connection is substantially facilitated by the connection apparatus. The adjustment with the operating lever allows a simple and simultaneously extremely precise and stable adjustment between the first and second positions so that the vacuum-tight connection can be established extremely simply and simultaneously securely, reliably and fast.

The first position, in which the coupling elements have the larger spacing, can in this respect correspond to the released position of the apparatus in which the connection apparatus can be placed onto the components or can be removed from them and the second position, in which the coupling elements have the smaller spacing, can correspond to the loaded or tightened position of the connection apparatus in which the connection apparatus holds the two components together for establishing a vacuum-tight connection and in particular presses together contact surfaces of the components sealingly with one another or with one of the plurality of sealing elements arranged between the components. The connection apparatus can easily be adjusted manually a multiple of times from the first position into the second position and vice versa so that the vacuum-tight fast connection can be repeatedly established and released again.

Advantageous embodiments of the invention are described in the further description and in the Figures.

The first coupling element and the second coupling element can be moved and/or urged toward one another by pivoting the operating lever in a direction which is transverse and in particular substantially perpendicular to a contact surface of at least one of the two components on an established vacuum-tight connection, with the respective component sealingly contacting the other component or a sealing element arranged between the components with said contact surface. The movement of the coupling elements can extend at least section-wise in a straight line in this direction or have a different extent with a direction component facing in this direction. By urging the coupling elements into a position in which they have a smaller spacing from one another with respect to the named direction, a contact pressure can be generated on components which are arranged between the coupling elements, which is directed transversely, in particular perpendicularly, to the contact surface of a component and which presses contact surfaces of the components toward one another in a vacuum-sealing manner. A contact surface can be formed by an end surface of a flange of the respective component and the direction in which the coupling elements can be moved toward one another can be directed transversely and e.g. substantially perpendicularly to the end surface or flange plane of the component.

The connection apparatus can be formed as a clamp and the two coupling elements can be formed as clamping jaws of the clamp between which the two components can be clamped or gripped for establishing the vacuum-tight connection.

The connection apparatus is preferably configured for establishing a vacuum-tight flange connection, with at least one component having a flange whose end surface can be pressed by the connection apparatus in a vacuum-sealing manner onto a contact surface of the other component or onto a sealing element. With a flange connection between two flanges, the end surfaces of the flanges are preferably pressed in a vacuum-sealing manner toward one another or toward one or more sealing elements arranged between the flanges. The connection apparatus can be formed as a clamp having two coupling elements or clamping jaws between which the two flanges can be clamped for establishing the vacuum-tight connection. The two flanges can be formed substantially complementary and/or have substantially congruent end surfaces. The flanges can be concentric to one another with an established connection and the end surfaces of the flanges can lie substantially congruent and frontal with respect to one another. An insertion ring and/or a centering ring which e.g. ensures a concentric arrangement of the flanges can be arranged between the flanges, optionally in addition to a sealing element.

A flange can, for example, be a small flange, in particular in accordance with DIN 28403, or an ISO-K flange or clamping flange, in particular in accordance with DIN 28404. An ISO-K flange or clamping flange can comprise a cut-out which is provided at the rear side of the flange and which springs in transversely and in particular perpendicularly to the flange plane of the flange. The connection apparatus can in particular be configured for establishing a flange connection between an ISO-K flange of the one component and an ISO-K flange of the other component which can each be configured as above.

A coupling element of the connection apparatus is preferably configured for coupling with the flange of a component. In accordance with an advantageous embodiment, the first coupling element and/or the second coupling element has/have a coupling section which is configured for contact with a rear side of a flange of a component and for exerting a clamping force directed transversely, and in particular perpendicularly, to the flange plane of the component onto the rear side of the flange of the component. The flange can thereby be pressed toward a corresponding connection section of the other component, in particular its flange, or toward a sealing element and a vacuum-tight connection can thereby be established.

The first coupling element and/or the second coupling element preferably has/have a projection which projects in the direction in which the respective coupling element can be moved toward the other coupling element. The direction in which the projection projects can in this respect be substantially parallel to the movement direction or can have at least one direction component parallel to the movement direction. The projection is preferably configured for engaging into a cut-out of one of the components which is in particular provided on a rear side of the flange of the respective component remote from the end surface of a flange and which springs in transversely, and in partiuclar perpendicularly, to the flange plane of the flange. An undercut can be provided between the coupling element and the flange by the projection and by its engagement into the cut-out which undercut is effective transversely, and in particular perpendicularly, to the movement direction of the coupling elements, whereby the connection apparatus is effectively fixed at the flange.

To establish the vacuum-tight connection, the coupling elements are preferably moved toward one another by adjusting the operating lever against a counter-force pair exerted by the components arranged between the coupling elements so that the components are clamped or gripped between the coupling elements and are pressed toward one another. To prevent the connection from being released again after the release of the operating element, the connection apparatus can preferably be locked in the second position, in partiuclar automatically, so that a movement of the coupling elements into the position further spaced apart from one another is prevented when an outer force pair acts on the coupling elements and urges the coupling elements in the direction of their position spaced further apart from one another so that the clamping or gripping effect and thus the vacuum-tight connection are maintained.

In accordance with an advantageous embodiment, the connection apparatus is configured such that, on the pivoting of the operating lever for bringing the connection apparatus from the first position into the second position, a dead center is exceeded on whose exceeding the pivot direction reverses in which the operating lever is urged when an outer force pair acts on the two coupling elements and urges the coupling elements in the direction of their position spaced further apart from one another. The operating lever can e.g. be urged in each case at both sides of the dead center in the pivot direction directed away from the dead center.

This aspect makes possible a particularly effective automatic lockability in the second position which is particularly simple to effect. An abutment can be provided, for example, which blocks a pivoting of the operating lever directed away from the dead center in the second position of the connection apparatus. A counter-force pair directed against the clamping effect of the connection apparatus and acting on the coupling elements from the outside then has the result that the operating lever is urged away from the dead center toward the abutment so that a self-reinforcing and thus extremely secure and effective locking of the connection apparatus in the second position defined by the abutment is achieved. The abutment can be formed by a component of the connection apparatus, for example by a section of a coupling element, and can act directly on the operating lever or on an element coupled thereto in a drive-effective manner.

Analog to the reversal of the pivot direction of the operating lever with an outer force pair acting on the coupling elements, the direction in which the coupling elements are moved or urged on a pivoting of the operating lever in a predefined pivot direction preferably also reverses at the dead center. On the pivoting of the operating lever from the first position into the second position, the coupling elements can accordingly first be moved or urged toward one another and, after the exceeding of the dead center, away from one another so that the minimal spacing of the coupling elements is reached at the dead center. The second position of the connection apparatus can be disposed relatively close to the dead center so that the spacing of the coupling elements in the second position approximately corresponds to the spacing of the coupling elements at the dead center.

The coupling elements are preferably movable toward one another by pivoting the operating lever along an at least approximately straight-line movement path, with the orientation of the coupling elements preferably remaining substantially the same. A guide for the two coupling elements is preferably provided. The two coupling elements can be guided relative to one another by a guide between the first and second positions on a predefined movement path so that an exactly defined relative movement of the coupling elements is achieved. The coupling elements can be guided by the guide, preferably along an at least approximately straight-line movement path and in particular with a substantially unchanging orientation relative to one another. The guide can be configured to take up forces acting transversely to the movement direction predefined by the guide on the coupling elements and thereby to improve the stability of the vacuum-tight connection which can be established by the connection apparatus.

The guide is preferably realized independently of the drive mechanism comprising the operating lever for adjusting the coupling elements. The guide can have a guide section which is arranged at least partly in a recess of a coupling element extending along the movement path and which is fixedly connected to the other coupling element or is at least partly arranged in a recess of the other coupling element. Both a reliable guide and an effective and loadable reception of forces acting transversely to the movement direction on the coupling elements is thereby achieved. In accordance with an advantageous embodiment, a toggle lever gripping mechanism is provided for the first coupling element and the second coupling element and comprises the operating lever and can be actuated with the operating lever to adjust the connection apparatus from the first position into the second position. Such a mechanism is particularly suitable for generating a gripping or clamping force between the two coupling elements. The operating lever preferably represents a toggle lever arm of the mechanism with which the coupling elements can be drawn toward one another against a counter-force pair urging the coupling elements apart. The toggle lever mechanism allows the achievement of a high gripping force or clamping force with a simple and easy actuation and moreover represents an extremely precise, robust, low-wear and reliable mechanism.

At least the first coupling element and preferably likewise the second coupling element are preferably each rotatably coupled to the operating lever. The second coupling element can in this respect in principle be directly rotatably coupled to the operating lever. A transmission element can also be provided for the drive-effective coupling of the second coupling element to the operating lever, with the transmission element being rotatably coupled to the operating lever and being coupled, preferably likewise rotatably, with the second coupling element. The pivotal connection of the transmission element to the second coupling element or the corresponding axis of rotation is in this respect spaced apart from the pivotal connection of the transmission element at the operating lever or the corresponding axis of rotation.

The first coupling element is preferably coupled to the operating lever rotatable about a first axis of rotation and the second coupling element or the transmission element coupled thereto in a drive-effective manner is coupled to the operating lever rotatable about a second axis of rotation, with the first axis of rotation and the second axis of rotation or the corresponding pivotal connections being spaced apart and the axes of rotation preferably being substantially parallel to one another so that a lever effect is achieved between the axes of rotation. The spacing of an outer end of the operating lever from the first axis of rotation or from the corresponding pivotal connection can in this respect amount to at least 1.5 times the spacing of the second axis of rotation from the first axis of rotation or between the corresponding pivotal connections, whereby an extended lever arm and an easy actuation of the apparatus is ensured.

The transmission element can represent the second toggle lever arm of a toggle lever gripping mechanism comprising the operating lever. The use of the transmission element furthermore has the advantage that a desired relative positioning and alignment of the first and second coupling elements can be ensured in the first and second positions and therebetween, in particular when a guide as described above is provided for the coupling elements.

An advantageous further development provides that the first coupling element is coupled to the operating lever rotatable about a first axis of rotation, the transmission element is coupled to the operating lever rotatable about a second axis of rotation and the transmission element is coupled to the second coupling element rotatable about a third axis of rotation. The first axis of rotation, the second axis of rotation and the third axis of rotation are in this respect preferably at least approximately in parallel with one another. As described in the following, this embodiment is particularly suitable for realizing a connection apparatus on whose bringing into the second position a dead center is exceeded. The rotatable couplings can in this respect each be configured such that a rotation is only permitted about the respective axis of rotation and a rotation about an axis of rotation oriented transversely thereto is prevented, whereby the stability is increased. The coupling can in each case be configured such that a displacement of the coupled components is prevented at least transversely to the axis of rotation.

In accordance with an embodiment, on the pivoting of the operating lever for adjusting the connection apparatus from the first position into the second position, a dead center is exceeded at which the first axis of rotation, the second axis of rotation and the third axis of rotation lie at least approximately on a straight line, with the second axis of rotation forming an end of the straight line and the first axis of rotation in particular lying between the second and third axes of rotation. The straight line is in this respect preferably oriented at least approximately in parallel with the direction in which the coupling elements are moved on the adjustment of the connection apparatus. On a loading of the coupling elements by an external force oriented in parallel with the movement direction of the coupling elements, no pivoting of the operating lever in a defined direction preferably takes place at the dead center position, but the operating lever and the transmission element are rather held in unstable balance.

The exceeding of the dead center has the effect that the pivot direction reversed in which the operating lever is urged by a force pair which acts on the coupling elements and which urges the coupling elements into their position spaced apart from one another. An abutment which prevents a corresponding pivoting of the operating lever in the second position, in particular directed away from the dead center, can be provided to effect a locking in the second position.

In accordance with an advantageous embodiment, at least one elastic element, in particular a spring element, is provided which is configured to counter a movement of the coupling elements in the direction of their position spaced further apart from one another by an elastic restoring force in the second position of the connection apparatus. The elastic element preferably serves to apply the required clamping force on the coupling elements in the second position with an established vacuum-tight connection. An exactly settable clamping force can be achieved by the use of the elastic element. The elastic element can furthermore counter a loosening of the established connection. The elastic element can, for example, be configured to move the coupling elements toward one another accordingly due to its elastic restoring force on a subsequent approach of the connected components, for example as a result of a vacuum generation, and thereupon to urge them further toward one another so that the coupling elements follow the relative movement of the connected components and thereupon exert a sufficient clamping force on them in an unchanged manner.

The at least one elastic element can be configured as part of the drive mechanism arranged between the operating lever and the coupling elements and configured for adjusting the coupling elements so that a force of the operating lever exerted onto the operating lever is transmitted via the elastic element onto the coupling elements and vice versa. The pivoting of the operating lever for adjusting the apparatus from the first position into the second position then preferably results in a corresponding movement of the coupling elements as long as the apparatus is not loaded, i.e. as long as no external counter-force acts on the coupling elements. If the apparatus is loaded, i.e. if an external counter-force is exerted onto the coupling elements which is directed against the free movement of the coupling elements, e.g. when the coupling elements abut the components to be connected, the pivoting of the operating lever preferably results in an elastic deformation of the elastic element. The elastic restoring force of the elastic element thereby caused urges the coupling elements in the direction of their free movement, whereby a clamping force is preferably generated which is exerted onto components arranged between the coupling elements.

No strict compulsory guidance is present between the operating lever and the coupling elements in this embodiment. Instead, a further pivoting of the operating lever is also made possible when the coupling elements already abut the components to be connected and then preferably results in a loading of the elastic element. A defined gripping force or clamping force and thus a secure connection can thereby be ensured securely and reliably substantially independently of slight differences in the dimensioning and relative positioning of the components to be connected or of sealing elements arranged therebetween. Independently of such variations, the operating lever can be pivoted into the second position which can, for example, be arranged at the outside of a dead center of the apparatus and at which e.g. a locking of the apparatus is ensured which is realized by an abutment.

An exemplary embodiment, which is explained in more detail in connection with the description of the Figures, provides that the transmission element is displaceably supported at a bearing element which is rotatably connected to the operating lever. A rotatable and simultaneously displaceable coupling is consequently provided between the transmission element and the operating lever. The transmission element can, for example, extend through a throughgoing opening of the bearing element for this purpose. At least one elastic element is preferably arranged between the transmission element and the bearing element and is configured to counter a displacement of the transmission element in a direction which corresponds to a movement of the coupling elements away from one another.

The elastic element ensures that a defined gripping force is exerted onto the components to be connected in the second position. Specifically, at least two plate springs can be provided as elastic elements which have an opening through which the transmission element extends, with the plate springs being arranged, and in particular being gripped, between the bearing element and an abutment of the transmission element.

In accordance with an advantageous embodiment, a setting apparatus is provided for setting an elastic restoring force which is exerted by the elastic element at a specific position of the connection apparatus. The force required for the pivoting of the operating lever and the force exerted onto the components to be connected in the second position of the connection apparatus can thereby be set. The setting apparatus can have an adjustable abutment for the elastic element, for example.

In accordance with an advantageous embodiment, a securing device is provided which can be actuated in the second position, with the actuated securing device counteracting an adjustment of the connection apparatus into the first position. The securing device can prevent or inhibit a pivoting of the operating lever in the direction of the first position independently of the coupling elements. An unintentional release of the vacuum-tight connection can thereby be avoided even more effectively.

The securing device can be configured so that it is automatically actuated on the adjustment of the connection apparatus into the second position. For example, the securing device can comprise a latch element which latches in on the adjustment of the connection into the second position. For example, the latch element can ensure a latching between the operating lever and a transmission element arranged between the operating lever and the second coupling element, which latching fixes the operating lever and the transmission element in a mutual angular position and prevents or inhibits a pivoting of the operating lever into the first position.

The securing device is preferably active between the operating lever and a transmission element coupling the operating lever with one of the coupling elements in a drive-effective manner. An unintentional pivoting can thereby be particularly effectively prevented. The securing device can in particular be effective in the region of an end of the operating lever which is remote from an axis of rotation about which the operating lever is pivotably supported at one of the coupling elements so that a particularly high lever effect and thus a high reliability of the security against pivoting is effected.

A further subject of the invention is a vacuum arrangement having at least two components which preferably each have a flange and having at least one connection apparatus as described herein for establishing a vacuum-tight connection, in particular a flange connection, between the two components. The advantageous embodiments and advantages described above with respect to the connection apparatus as well as to the use of the connection apparatus for establishing a vacuum-tight connection apply accordingly to the vacuum arrangement in accordance with the invention.

The at least two components can in principle be any desired elements which are configured for the at least part limiting of a vacuum-tight volume and which have a connector or a flange for the gas-conducting connection to the volume of a further component. For example, one component can be a pipe or a part of a vacuum piping and the other component can be a metal-spring bellows. One component can equally be a vacuum pump. The connection apparatus preferably effect a releasable vacuum-tight clamp connection between the components which is based on the vacuum-sealing pressing together of contact surfaces between the components and in particular forms a closed annular orbit about the inner volume bounded by the vacuum arrangement.

BRIEF DESCRIPTION OF THE DRAWINGS

The present invention will be described in the following by way of example with reference to advantageous embodiments and to the enclosed drawings. The drawings show:

FIG. 8 a connection apparatus in accordance with a further embodiment of the invention in a perspective representation;

FIGS. 9 and 10 a vacuum arrangement in accordance with an embodiment of the invention with the connection apparatus shown in FIG. 8 in a longitudinal section in a first position (FIG. 9) and in a second position (FIG. 10);

FIG. 11 an enlarged representation of the detail A of FIG. 10;

FIG. 12 the connection apparatus shown in FIGS. 8 to 11 in a representation sectioned along the line III-III of FIG. 13;

FIG. 13 the connection apparatus shown in FIGS. 8 to 12 in a plan view;

FIG. 14 the connection apparatus shown in FIGS. 8 to 13 in a representation sectioned along the line I-I of FIG. 13;

FIG. 15 the connection apparatus shown in FIGS. 8 to 14 in a representation sectioned along the line II-II of FIG. 13;

DETAILED DESCRIPTION OF THE PREFERRED EMBODIMENTS

FIGS. 1 to 7 show a connection apparatus in accordance with a first embodiment of the invention. The connection apparatus is configured as a clamp which is suitable for establishing a releasable vacuum-tight flange connection between two components which each have a clamp flange or an ISO-K flange.

Figure 1:
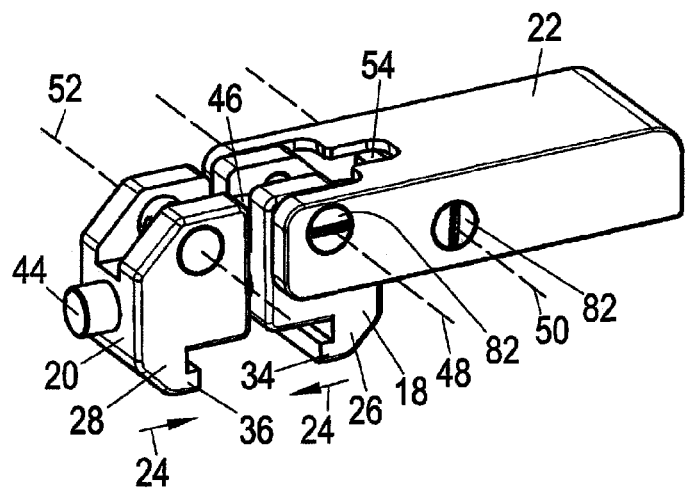
FIG. 1 a connection apparatus in accordance with an embodiment of the invention in a perspective representation.

FIG. 1 shows the apparatus in a perspective representation. The apparatus comprises a first coupling element 18 for coupling with the flange of a first component and a second coupling element 20 for coupling with the flange of a second component. The coupling elements 18, 20 each have a coupling section 26, 28 having a projection 34, 36 for coupling with the respective flange. The coupling elements 18, 20 are longitudinally displaceably guided with respect to one another over a cylinder bolt-like guide element 44 in parallel with the arrows 24. The guide element 44 is fixedly connected to the coupling element 18 and extends through a cylindrical opening of the coupling element 20 (cf. also FIG. 2).

The connection apparatus is adjustable via an operating lever 22 actuated by hand between a first position and a second position. For this purpose, the operating lever 22 is connected to the coupling element 18 rotatable about an axis of rotation 48 and a transmission element 46 is connected to the operating lever 22 rotatable about an axis of rotation 50 and is connected to the coupling element 20 rotatable about an axis of rotation 52, with the axes of rotation 48, 50, 52 being parallel with one another. The operating lever 22 and the transmission element 46 form a toggle lever gripping mechanism for the coupling elements 18, 20 with which a counter-effect can be exerted on the coupling elements 18, 20 for establishing the vacuum-tight connection so that they move toward one another in the direction of the arrows 24 with an unloaded connection apparatus or exert a gripping force acting in this direction on the components to be connected with a connection apparatus coupled to the components to be connected. The operation of the apparatus is explained in more detail in the following with reference to FIGS. 2 and 3.

Figure 2:
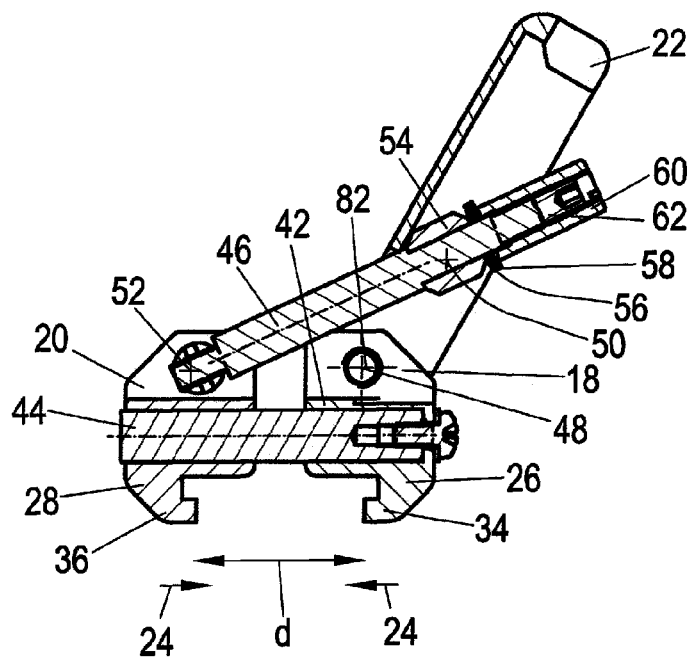
FIGS. 2 and 3 the connection apparatus shown in FIG. 1 in a longitudinal section in a first position (FIG. 1) and in a second position (FIG. 3)

FIG. 2 shows the apparatus in a first position in a longitudinal section. The operating lever is pivoted by an angle of approximately 60° with respect to the connection line between the axes of rotation 48, 52 in this position. The toggle lever pincers formed by the operating lever 22 and the transmission element 46 are open in this position, that is the triangle formed by the axes of rotation 48, 50, 52 has an opening angle of approximately 30° in the present case at the axis of rotation 50, which corresponds to a larger spacing between the axes of rotation 48, 52 and consequently to a larger spacing $d_1$ of the coupling elements 18, 20 from one another, with the spacing $d_1$ being given by the clearance between the coupling sections 26, 28 of the coupling elements 18, 20.

Starting from the first position shown in FIG. 2, the connection apparatus can be adjusted by a manual pivoting of the operating lever 22 clockwise into the second position. In this respect, the toggle lever pincers formed by the operating lever 22 and the transmission element 46, i.e. the opening angle of the triangle formed by the axes of rotation 48, 50, 52 at the axis of rotation 50, are reduced and the coupling elements 18, 20 are moved toward one another in the direction of the arrows 24 until the axes of rotation 48, 50, 52 lie on a common straight line which is parallel to the displacement direction 24 of the coupling elements 18, 20 in the present embodiment.

The position at which the axes of rotation 48, 50, 52 lie on a straight line represents a dead center position of the apparatus on whose exceeding the pivot direction reverses in which the operating lever 22 is urged when an outer force pair acts on the coupling elements 18, 20 which urges the coupling elements 18, 20 against the arrows 24 into their position spaced further apart from one another. On the further pivoting of the operating lever 22 clockwise beyond the dead center, the coupling elements 18, 20 are moved slightly apart and the toggle lever pincers open again up to an opening angle of somewhat less than 10°.

Figure 3:
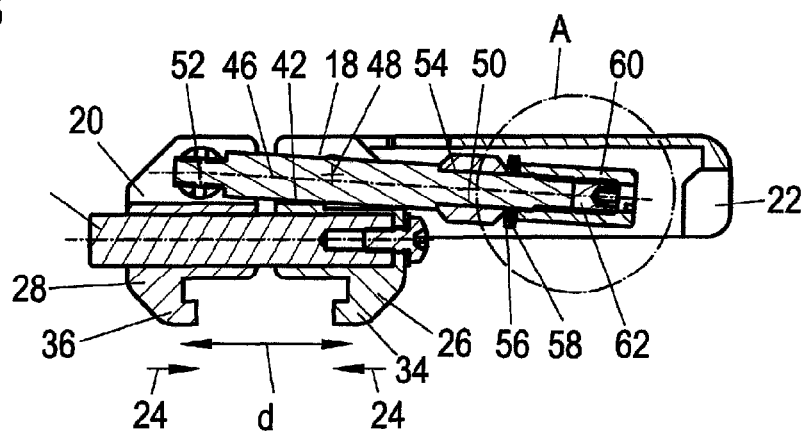

FIG. 3 shows the connection apparatus in the second position in which the connection apparatus is adjusted slightly beyond the dead center. The spacing $d_2$ between the coupling elements 18, 20 is in this position somewhat larger than the minimal spacing which is reached in the dead center position, but is much lower than in the first position shown in FIG. 2 due to the smaller opening angle.

When the two coupling elements 18, 20 in the second position shown in FIG. 3 are moved apart by a force pair directed against the arrows 24, the operating lever 22 and the transmission element 46 are urged into the pivot direction oriented clockwise. The coupling element 18 forms an abutment surface 42 for the transmission element 46 which abutment surface blocks such a pivoting so that a moving apart of the coupling elements 18, 20 is prevented and the apparatus is locked in the second position. The connection can thus only be released by a manually actuated pivoting of the operating lever 22 counter-clockwise by a user.

The adjustment beyond the dead center into the second position effects a slight moving apart of the coupling elements 18, 20. In order nevertheless to make possible a fixed connection with high clamping force, two spring elements 56, 58 configured as plate springs are provided in accordance with the invention via which the transmission element 46 is coupled to the operating lever 22. The transmission element 46 extends through an opening of a bearing element 54 which is oriented in the axial direction of the transmission element 46 and which is supported rotatable about the axis of rotation 50 and in a manner fixed with respect to displacement at the operating lever 22 so that the transmission element 46 is supported rotatable about the axis of rotation 50 and displaceable in the direction of its longitudinal axis at the operating lever 22.

The displaceability of the transmission element 46 allows a movement of the operating lever 22 without simultaneously having to move the coupling elements 18, 20 when they e.g. already abut the components to be connected. Such a movement results in a pressure action on the plate springs 56, 58 which are gripped between the bearing element 54 and a setting element 60 connected to the transmission element 46 and whose elastic restoring force urges the coupling elements 18, 20 toward one another.

The coupling elements 18, 20 can thus already abut the flanges of the components to be connected before reaching the dead center on the adjustment into the second position, whereupon a further adjustment of the operating lever 22 with respect to the elastic restoring force of the plate springs 56, 58 is possible and the apparatus can thus be brought into the second position. On an established vacuum-tight connection, the plate springs 56, 58 are spring-loaded and determine the clamping force exerted onto the flanges by the coupling elements 18, 20.

To allow a setting of this clamping force, the setting element 60 is provided which forms an abutment for the plate spring 58 and can be fixed at different axial positions to the transmission element 46. The load of the plate springs 56, 58 and the clamping force caused by the apparatus in the second position can thereby be set. In the present embodiment, the setting element 60 is connected to the transmission element 46 via a screw connection, whereby an adjustment of the axial position of the setting element 60 relative to the transmission element 46 is made possible. To lock the setting element 60 in a desired position, a fixing element 62 is provided which is screwed to the setting element 60 and is thereby adjustable in an axial direction relative to the setting element 60. The fixing element 62 forms an abutment for the setting element 60 and for the transmission element 46 and locks the setting element 60 in a desired axial position relative to the transmission element 46.

Figure 4:
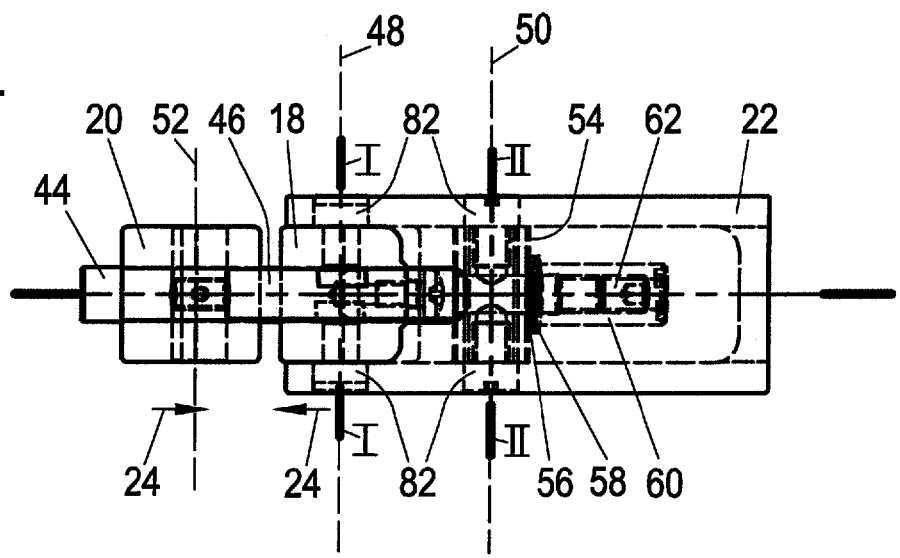
FIG. 4 the connection apparatus shown in FIGS. 1 to 3 in a plan view.
Figure 5:
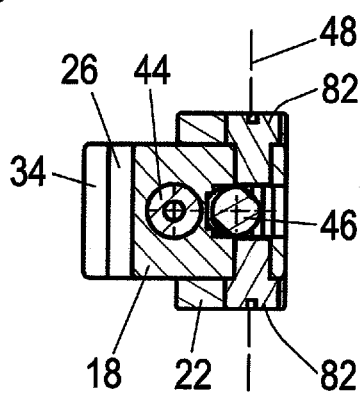
FIG. 5 the connection apparatus shown in FIGS. 1 to 4 in a representation sectioned along the line I-I of FIG. 4.
Figure 6:
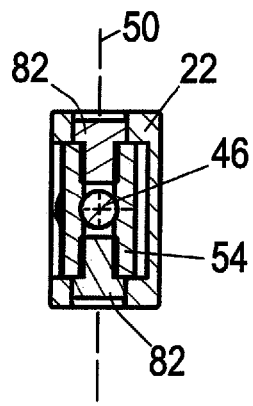
FIG. 6 the connection apparatus shown in FIGS. 1 to 5 in a representation sectioned along the line II-II of FIG. 4.

FIG. 4 shows the connection apparatus shown in FIGS. 1 to 3 in the second position in a partly transparent plan view. FIGS. 5 and 6 show the connection apparatus in a representation sectioned along the line I-I or II-II shown in FIG. 4 and viewed from the coupling element 20. In particular the purely rotary connections can be recognized which are formed by pivot joints and which couple the coupling elements 18, 20 in each case rotatable about the axis of rotation 48 or 52 and fixed with respect to displacement to the operating lever 22 or to the transmission element 46 or which couple the bearing element 45, with which the transmission element is longitudinally displaceably coupled rotatable about the axis of rotation 50 and fixed with respect to displacement to the operating lever 22.

The pivotal joints forming the axes of rotation 48 and 50 each comprise two bolt-like elements 82 (see also FIGS. 5 and 6) which are rotatably coupled to the operating lever 22 about the respective rotary axis 48, 50 and which are fixedly connected, in particular screwed, to the coupling element 18 or to the bearing element 54, with the mutually contacting contact surfaces of the elements 82, on the one hand, and of the coupling element 18 or of the bearing element 34, on the other hand, preferably being adhesively bonded by an adhesive such as Loctite to secure the fixed connection.

Figure 7:
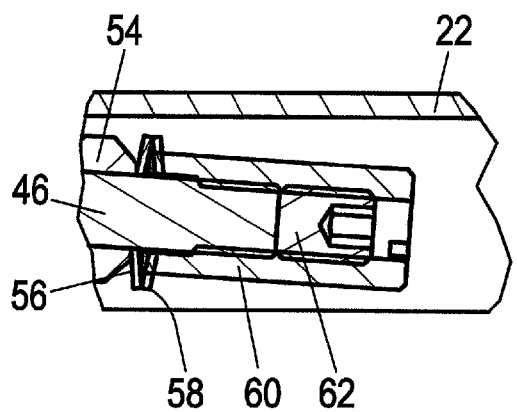
FIG. 7 the section A of FIG. 3 in an enlarged representation.

FIG. 7 shows the section A of FIG. 3 including the plate springs 56, 58 in an enlarged representation. The plate springs 56, 58 gripped through by the transmission element 46 are arched inwardly on a respective one side and contact one another at their inwardly arched sides to achieve the spring effect.

FIGS. 8 to 15 show a connection apparatus in accordance with a second embodiment of the invention which substantially corresponds to the connection apparatus shown in FIGS. 1 to 7 so that in the following only the differences between the connection apparatus will be looked at. In addition, in FIGS. 9 and 10, the use of the connection apparatus in a vacuum arrangement having two components 10, 12 to be connected in a vacuum-tight manner is shown.

The connection apparatus shown in FIGS. 8 to 15 additionally comprises a securing device by which the connection apparatus can be secured against unintentional pivoting of the operating lever 22 in the second position. The security comprises a pin-like latch element 64 which is displaceably supported in a direction longitudinally displaceably at the operating lever 22, said direction substantially corresponding to the orientation of the transmission element 46 in the second position, as can in particular be seen in FIG. 10 and in the enlarged representation in FIG. 11. A spring element 66 urges the latch element 64 into the latch position shown in FIGS. 9 to 11. An actuation element 72 is coupled to the latch element 64 and extends transversely to the displacement direction of the latch element 64 and is displaceably supported in an elongate hole 74 of the operating lever 22 in each case at its two outer ends and projects outwardly for actuation by a user. The latch element 64 can be pushed back via the actuation element 72 into an unlatched position in which the securing is cancelled.

On the pivoting of the operating lever 22 from the first position shown in FIG. 9 into the second position shown in FIG. 10, a run-on chamfer 68 of the latch element 64 runs on the setting element 60 and is displaced back against the restoring force of the spring 66 on a further pivoting of the operating lever 22. On a further pivoting, the latch element 64 moves into a cut-out of the setting element 60 due to the restoring force of the spring 66 and latches with said setting element. The latch element 64 in this respect forms an undercut with the setting element 60 which undercut is effective in the pivot direction which leads back to the first position, whereby a pivoting of the operating lever 22 in this direction is prevented or at least inhibited.

Since the undercut is formed by a run-on chamfer 70 of the latch element 64, the chamfer having a relatively shallow inclination angle with respect to the displacement direction of the latch element 64, a release of the connection by a sole pivoting back of the operating lever 22 is admittedly possible in principle, but only with a much increased force effort so that a securing is achieved in the second position. In principle the securing device could also be configured so that a release of the connection by a sole pivoting of the operating lever 22 is not possible at all.

An unintentional release of the connection is thus prevented or at least made more difficult. For the intended release of the connection, the actuation element 72 of the securing device can be retracted and the latch element 64 can thus be brought out of engagement with the setting element 60 so that a pivoting back of the operating lever 22 and thus a movement of the apparatus into the first position is possible without impediment.

FIGS. 9 and 10 illustrate the use of the connection apparatus for establishing a vacuum-tight connection between two components 10, 12. The components 10, 12 each represent a tubular section and comprise a clamping flange 14, 16 which projects from the tubular section and is rotationally symmetrical to the longitudinal flange axis which is perpendicular to the flange plane and corresponds to the horizontal image axis in FIG. 9. A respective cut-out 38, 40 which is bounded parallel to the flange plane radially outwardly by a projection of the flange 14, 16 is formed on the rear sides 30, 32 of the flanges 14, 16. A seal 76 for establishing a vacuum-tight connection and two centering rings 78, 80 for centering the flanges are arranged between the mutually facing end faces of the flanges.

As shown in FIG. 10, the coupling sections 26, 28 of the coupling elements 18, 20 in the second position abut the rear sides 30, 32 of the flanges 14, 16 and clamp them between them such that a vacuum-tight clamping connection is provided all around between the flanges 14, 16. Together with the projections of the flanges 14, 16 bounding the cut-outs 38, 40, the projections 34, 36 form an undercut which is outwardly active parallel to the flange plane in the radial direction, whereby the connection apparatus if additionally fixed.

Figure 16:
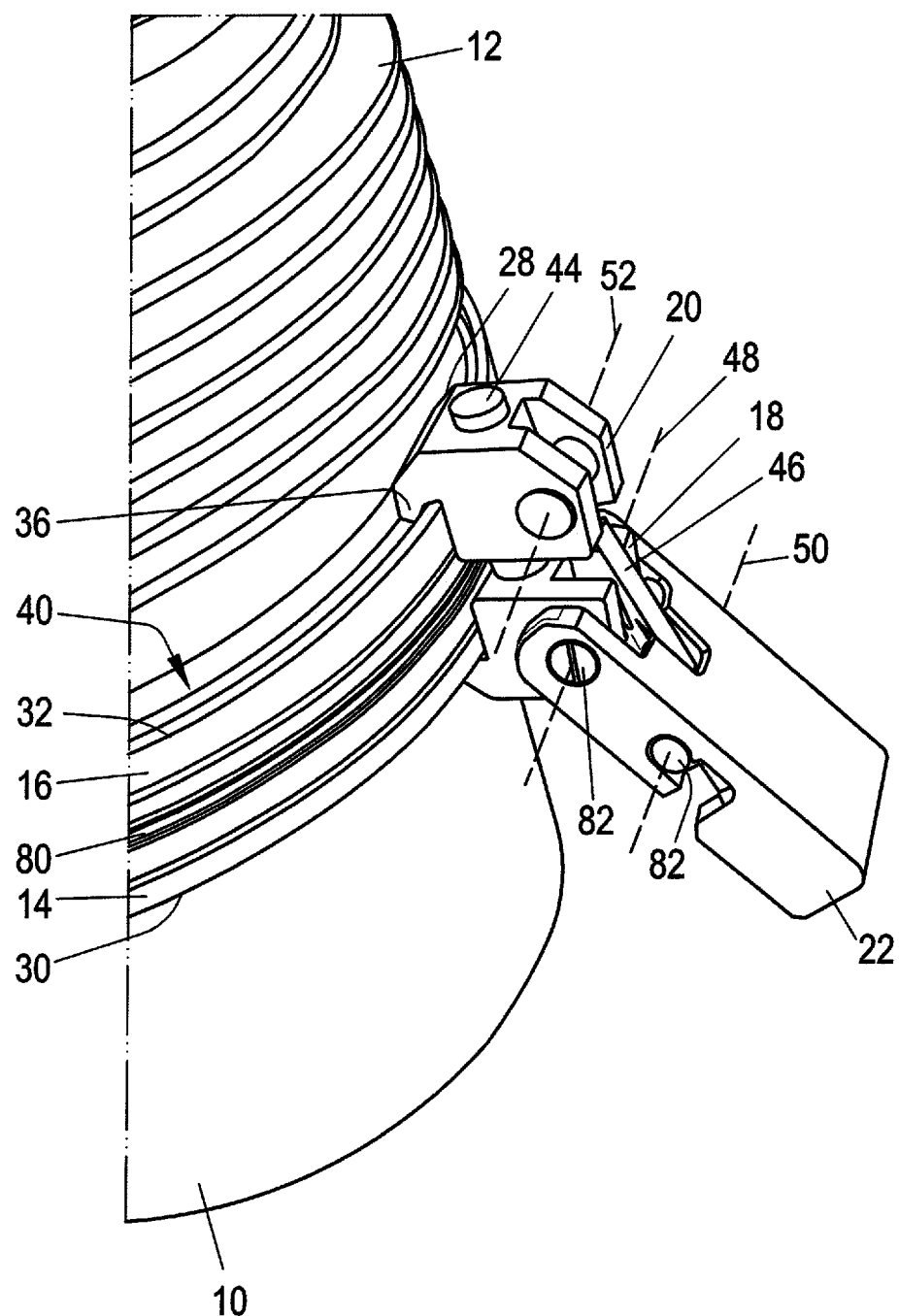
FIG. 16 a vacuum arrangement in accordance with an embodiment of the invention in a perspective view.
Figure 17:
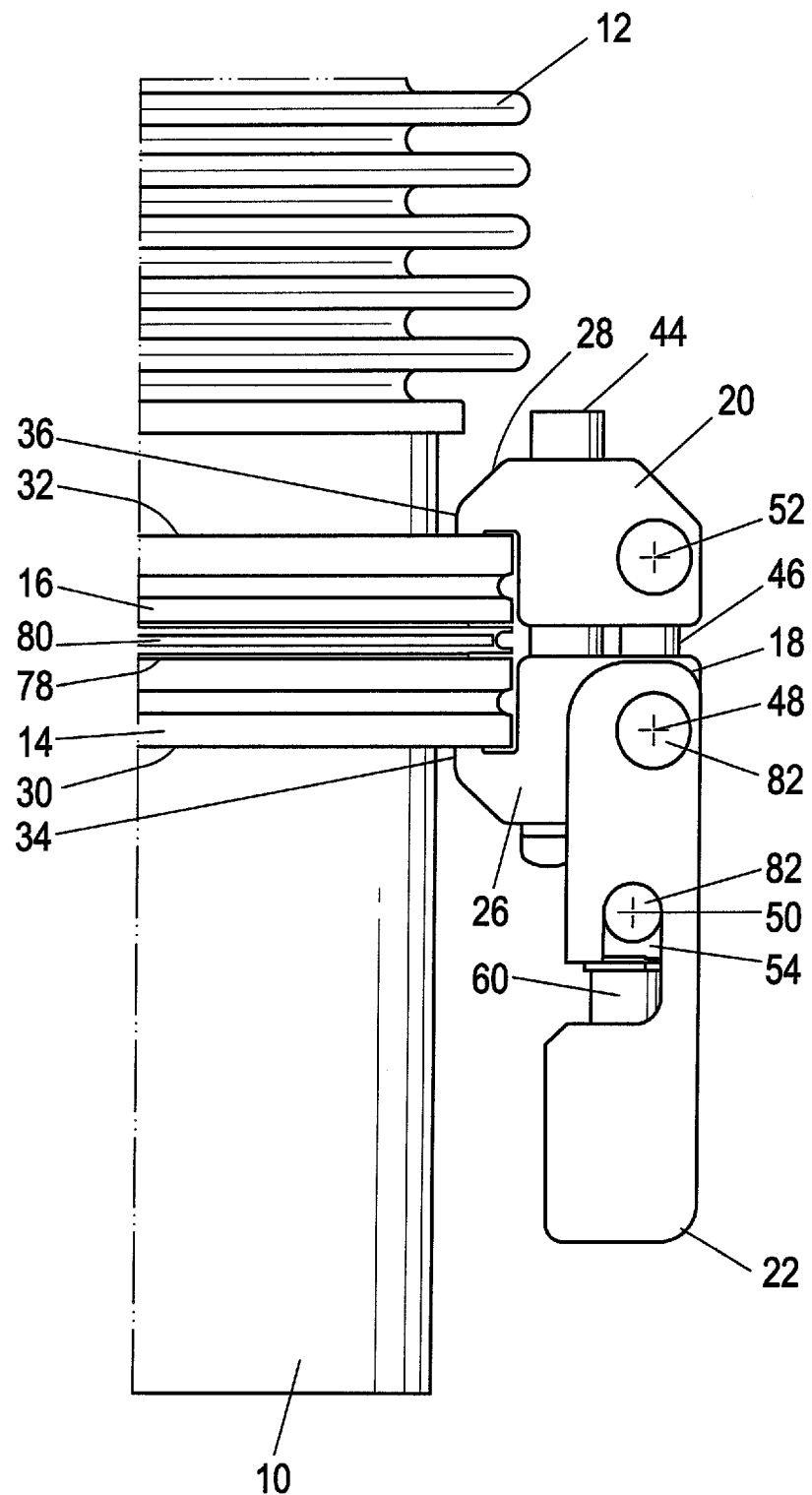
FIG. 17 the vacuum arrangement shown in FIG. 16 in a side view.

FIGS. 16 and 17 show a further vacuum arrangement which comprises a connection apparatus shown in FIGS. 1 to 7 as well as a first component 10 formed by a tubular section and a further component 12 formed by a flexible metal spring bellows, both components being connected to the connection apparatus in a vacuum-tight manner. As shown in FIG. 16, the connection apparatus extends only over a part of the periphery of the flanges 14, 16. To establish a reliable vacuum-tight connection over the total periphery of the flanges 14, 16, a plurality of connection apparatus of the described manner can be provided distributed around the flange periphery.

What is claimed is:

1. A vacuum arrangement having at least two vacuum-tight connectable components (10, 12), comprising a first coupling element (18) for coupling to one component (10) and a second coupling element (20) for coupling to another component (12),
    wherein the first coupling element (18) and the second coupling element (20) are coupled to one another via a operating lever (22) pivotable from a first position in which the first and second coupling elements (18, 20) have a larger spacing ($d_1$) from one another into a second position in which the first and second coupling elements (18, 20) have a smaller spacing ($d_2$) from one another,
    wherein a transmission element (46) for the drive-effective coupling of the second coupling element (20) with the operating lever (22) is provided, which is rotatably coupled to the operating lever (22) and which is coupled to the second coupling element (20),
    wherein the transmission element (46) slidably extends through an opening of a bearing element (54) supported for rotation about a rotational axis (50) and fixedly connected with the operating lever (22) for joint rotation therewith,
    wherein a guide for guiding the first and second coupling elements (18, 20) relative to one another along an at least approximately straight-line movement path is provided, and wherein the guide has a guide section (44) which is arranged at least partly in a recess of one of the first and second coupling elements (18, 20) extending along the movement path and which is fixedly connected to the other of the first and second coupling elements (18, 20) or is at least partly arranged in a recess of the other of the first and second coupling elements (18, 20).

2. A vacuum arrangement in accordance with claim 1, wherein the first coupling element (18) and the second coupling element (20) can be at least one of urged toward one another and moved toward one another by pivoting the operating lever (22) in a direction (24) which, with an established vacuum-tight connection, is transverse to and in particular substantially perpendicular to a contact surface of at least one of the two components (10, 12), the contact surface the respective component (10, 12) sealingly contacting the other component (10, 12) or a sealing element (76) arranged between the components (10, 12).

3. A vacuum arrangement in accordance with claim 1, wherein at least one of the first coupling element (18) and the second coupling (20) has a coupling section (26, 28) configured for contact with a rear side (30, 32) of a flange (14, 16) of a component (10, 12) and for exerting a clamping force directed transversely to a plane defined by the flange of the component (10, 12) onto a rear side (30, 32) of the flange (14, 16) of the component (10, 12).

4. A vacuum arrangement in accordance with claim 3, wherein said clamping force is directed perpendicular to said plane.

5. A vacuum arrangement in accordance with claim 1, wherein
    at least one of the first coupling element (18) and the second coupling element (20) has a projection (34, 36) which projects in a direction (24) in which the respective coupling element (18, 20) can be moved toward the other coupling element (18, 20) and which is configured for engaging into a cut-out (38, 40) of a component (10, 12) which is provided on a rear side (30, 32) of a flange (14, 16) of that component (10, 12).

6. A vacuum arrangement in accordance with the claim 1, wherein
    on the pivoting of the operating lever (22) for bringing the vacuum arrangement elements from the first position into the second position, a dead center is exceeded so that the pivot direction in which the operating lever (22) is urged when a force pair acts on the coupling elements (18, 20) urging them in the direction of their position spaced further apart from one another is reversed.

7. A vacuum arrangement in accordance with claim 6, wherein an abutment (42) is provided which blocks a pivoting of the operating lever (22) directed away from the dead center in the second position of the vacuum arrangement.

8. A vacuum arrangement in accordance with claim 1, wherein
    a toggle lever gripping mechanism is provided for the two coupling elements (18, 20), with the toggle lever gripping mechanism comprising the operating lever (22) and being able to be actuated by the operating lever (22) to adjust the vacuum arrangement from the first position into the second position.

9. A vacuum arrangement in accordance with claim 1, wherein
    the first coupling element (18) is rotatably coupled to the operating lever (22) about a first axis of rotation (48) and the transmission element (46) is rotatably coupled to the operating lever (22) about a second axis of rotation (50) and is rotatably coupled to the second coupling element (20) about a third axis of rotation (52).

10. A vacuum arrangement in accordance with claim 9, wherein
    the first axis of rotation (48), the second axis of rotation (50) and the third axis of rotation (52) are at least approximately parallel to one another.

11. A vacuum arrangement elements, in accordance with claim 9, wherein
    on the pivoting of the operating lever (22) for adjusting the vacuum arrangement from the first position into the second position, a dead center is exceeded at which the first axis of rotation (48), the second axis of rotation (50) and the third axis of rotation (52) lie at least approximately on a straight line.

12. A vacuum arrangement in accordance with claim 11, wherein the second axis of rotation (50) is arranged at an end of the straight line.

13. A vacuum arrangement in accordance with claim 1, wherein
- at least one elastic element (56, 58) is provided which is configured to counter a movement of the coupling elements (18, 20) in the direction of their position spaced further apart from one another by an elastic restoring force in the second position of the vacuum arrangement.

14. A vacuum arrangement in accordance with claim 13, wherein
- an adjustment apparatus for setting an elastic restoring force is provided which is exerted by the elastic element (56, 58) in a specific position of the vacuum arrangement.

15. A vacuum arrangement in accordance with claim 1, wherein
- a securing device is provided which can be activated in the second position, with the activated securing device counteracting an adjustment of the vacuum arrangement into the first position.

16. A vacuum arrangement in accordance with claim 15, wherein the securing device comprises a latch element (64) which latches on the adjustment of the vacuum arrangement into the second position.

17. A vacuum arrangement in accordance with claim 16, wherein
- the securing device is active between the operating lever (22) and a coupling transmission element (46) coupling in a drive-effective manner with one of the coupling elements (18, 20).

18. A vacuum arrangement in accordance with claim 1, wherein each component has a respective flange (14, 16).

* * * * *